United States Patent [19]

Gerber

[11] Patent Number: 5,179,177

[45] Date of Patent: Jan. 12, 1993

[54] METHOD FOR RETARDING AMBIENT TEMPERATURE HARDENING OF A PHENOLIC RESIN COMPOSITION

[75] Inventor: Arthur H. Gerber, Louisville, Ky.

[73] Assignee: Borden, Inc., Columbus, Ohio

[21] Appl. No.: 748,707

[22] Filed: Aug. 22, 1991

Related U.S. Application Data

[63] Continuation-in-part of Ser. No. 562,206, Aug. 2, 1990, Pat. No. 5,096,983.

[51] Int. Cl.⁵ .................. C08F 283/00; C08G 8/28; C08L 61/00; C08L 85/04
[52] U.S. Cl. .................. 525/506; 523/139; 523/145; 523/146; 528/129; 525/508
[58] Field of Search ............... 528/140, 129, 144, 161; 525/506, 508, 534; 523/140, 143, 139, 145, 146

[56] References Cited

U.S. PATENT DOCUMENTS

| | | | |
|---|---|---|---|
| Re. 32,720 | 7/1988 | Lemon et al. | 523/145 |
| Re. 32,812 | 12/1988 | Lemon et al. | 523/145 |
| 2,424,787 | 7/1947 | Adams, Jr. | 260/38 |
| 2,712,533 | 7/1955 | Mitchell | 260/25 |
| 2,869,191 | 1/1959 | Cooper et al. | 22/147 |
| 2,869,194 | 1/1959 | Cooper | 22/193 |
| 2,869,196 | 1/1959 | Cooper | 22/193 |
| 2,913,787 | 11/1959 | Cooper | 22/193 |
| 3,666,703 | 5/1972 | Murata et al. | 260/29.3 |
| 4,264,671 | 4/1981 | Gillern et al. | 428/302 |
| 4,282,288 | 8/1981 | Yoshino et al. | 428/408 |
| 4,473,654 | 9/1984 | Stendera | 501/108 |
| 4,539,343 | 9/1985 | Nishimura | 523/145 |
| 4,657,950 | 4/1987 | Iyer et al. | 523/145 |
| 4,668,759 | 5/1987 | Iyer et al. | 528/139 |
| 4,740,535 | 4/1988 | Iyer et al. | 523/145 |
| 4,758,478 | 7/1988 | Daisy et al. | 428/529 |
| 4,794,051 | 12/1988 | Gupta | 428/524 |
| 4,831,067 | 5/1989 | Emon et al. | 523/156 |
| 4,848,443 | 7/1989 | Westwood et al. | 528/161 |
| 4,939,188 | 7/1990 | Gerber | 523/146 |
| 4,961,795 | 10/1990 | Detlefsen et al. | 156/62.2 |
| 4,964,917 | 10/1990 | Bobrowski | 106/804 |
| 5,002,908 | 3/1991 | Cassans, Jr. | 501/99 |

FOREIGN PATENT DOCUMENTS

| | | |
|---|---|---|
| 0202004 | 11/1986 | European Pat. Off. . |
| 37884 | 10/1978 | Japan . |
| 60-20251 | 5/1985 | Japan . |
| 8901526 | 6/1990 | PCT Int'l Appl. . |
| 1316994 | 6/1987 | U.S.S.R. . |

OTHER PUBLICATIONS

Abstract of Japanese Kokai JP57051176 of 820325 and assigned to Kolsasaki Steel KK.

Primary Examiner—John Kight, III
Assistant Examiner—Richard Jones
Attorney, Agent, or Firm—Kenneth P. Van Wyck; Dennis H. Rainear; George P. Maskas

[57] ABSTRACT

Retarding the hardening of a composition containing a phenolic resin solution and a magnesia aggregate is effected by mixing into such composition a compound which provides an aspartate, fluoride, bifluoride, malate, tartrate, citrate, oxalate, phosphate or phosphonate anion to the composition or a tetraalkoxy silane, a partially hydrolyzed tetraalkoxy silane, 2-, or 4-chlorophenol, or 2'-, or 4'-hydroxyacetophenone.

55 Claims, No Drawings

METHOD FOR RETARDING AMBIENT TEMPERATURE HARDENING OF A PHENOLIC RESIN COMPOSITION

This application is a continuation-in-part of my co-pending application Ser. No. 07/562206 which was filed on Aug. 2, 1990, now U.S. Pat. No. 5,096,983.

BACKGROUND OF THE INVENTION

My above mentioned patent application sets forth compounds which retard the hardening of phenolic resole resins admixed with hardening quantities of lightburned magnesium oxide or magnesium hydroxide, either alone or together with an ester functional hardening agent. Table 3 in the above mentioned patent application also relates to retarding the hardening of periclase in admixture with a phenolic resole and an ester functional hardening agent by use of a retarder.

This invention relates to methods and compositions useful in the manufacture and use of ceramic and refractory compositions. More particularly this invention relates to methods and compositions for retarding the hardening of compositions containing hardburned magnesia or deadburned magnesia, both of which are simply referred to herein as "magnesia aggregate", and a curable phenolic resin, with or without the inclusion of an ester functional hardening agent. Such retardation is accomplished by incorporating in the compositions certain compounds such as those which supply 2- or 4-acetylphenol, also referred to as 2'- or 4'-hydroxyacetophenone, tetraalkoxy silanes, or fluoride, bifluoride, malate, tartrate, citrate, phosphonate, or phosphate anions to the composition.

Phenolic resins are widely used as refractory binders. However, they have certain drawbacks when used as binders for magnesia aggregate. Mixtures of magnesia aggregate and a hardenable or curable phenolic resin are relatively inactive in comparison with mixtures of lightburned magnesium oxide and phenolic resole resins. However, when magnesia aggregate is mixed with liquid phenolic resins, the wet mixtures tend to harden in a comparatively short time at ambient temperature. This reduces the time that the mix can be retained before it must be used such as shaped into various articles. The addition of a retarder of this invention prolongs the working time of such mixtures by retarding their rate of ambient temperature hardening.

DESCRIPTION OF THE RELATED ART

The problem of premature hardening of magnesia aggregate when phenolic resole resins are used as binders is recognized in the prior art. U.S. Pat. No. 4,657,950 to R. Iyer et al. of Apr. 14, 1987 solves the problem of such premature hardening by use of a modified resole resin.

U.S. Pat. No. 4,539,343 of Sep. 3, 1985 to T. Nishimura recites the use of compounds having a pKa of less than 9.5 at 25° C. such as salicylic acid, oxalic acid, malonic acid, and phosphoric acid together with a solid phenolic resin and magnesia containing compositions in order to eliminate reddish color and improve flexural strength of refractory materials.

U.S. Pat. No. 4,964,917 of Oct. 23, 1990 to G.S. Borowski et al. relates to a method for retarding the hydration of concrete by adding to the concrete a chelation agent for calcium. Such agents include certain phosphonic acids, citric or other hydroxycarboxylic acids.

U.S. Pat. No. 4,939,188 to A.H. Gerber of Jul. 3, 1990 relates to the use of lithium alkalizing agents for hardening of phenolic resole resins with ester functional hardening agents for binding refractory aggregates such as magnesia.

U.S. Pat. No. 4,264,671 of Apr. 28, 1981 to M. Gillern et al. relates to phenolic resole resins having a high formal and low methylol group ratio for use in the manufacture of glass laminates. The resin is made under alkaline conditions and neutralized with an acid. Weak acids such as citric acid are preferred.

U.S. Pat. No. 5,002,908 of Mar. 26, 1991 to Cassens, Jr. relates to the use of phenolic resins for binding periclase (deadburned magnesia), and the use of potassium borate to improve the processability of the composition. That patent states that impurities in the borate should be avoided and particularly advises that fluorine be kept to less than 1%.

U.S. Pat. No. 4,282,288 of Aug. 4, 1981 to Yoshino et al. relates to a graphite refractory article with a powdered phenolic resin as binder and at least one of alumina, magnesia, silicon carbide, coke and zirconia and/or at least one of silicon, phosphate and borate salts. The total amount of these additives should be up to 10 weight parts against 100 weight parts of the graphite.

U.S. Pat. No. 4,831,067 of May 16, 1989 to Lemon et al. discloses the hardening of alkaline phenolic resole resins with an ester functional hardening agent. Alkalis recited as suitable are sodium hydroxide or potassium hydroxide or a mixture of these with alkaline earth oxides or hydroxides such as magnesium oxide, etc.

Japanese Kokkai Tokyo Koho JP 60/90251 of May 21, 1985 to Kyushu Refractories Co. Ltd. discloses the room temperature hardening of resole resins with magnesium oxide and ethylene carbonate.

Abstract of Soviet Union patent application SU 1316994 of 870615 to Simonov et al. relates to improved properties of refractories containing magnesia aggregate bound with a phenolic resin by the addition of chloride or bromide salts to the compositions.

Abstract of Japanese patent applications JP 49026312 dated 740308 and JP 78037884 dated 781012 as well as Japanese patent application publication No.37884/1978 which was published on Oct. 12, 1978 to Nihon Tokushu Rozai Co. relate to refractory molding compositions containing aggregate, certain phenolic resins, and a phosphate.

Abstract of Japanese Kokai JP 57051176 of 820318 and assigned to Kawasaki Steel KK relates to a phenolic resin, a fireproof aggregate, and phosphate additive.

U.S. Pat. No. 4,794,051 of Dec. 27, 1988 to M. K. Gupta discloses molding compositions comprising: (a) a phenolic resole resin; (b) a hardening agent of alkaline metal oxides or hydroxides e.g. magnesium oxide or magnesium hydroxide, and silanes; (c) a filler; (d) a lactone; and (e) a fiber reinforcement.

International Application No. PCT/GB89/01526 having an effective filing date of Dec. 21, 1989 to Lemon et al. discloses the preparation of phenolic resole resins with alkali or alkaline earth metal compounds as the basic catalyst and the subsequent room temperature hardening of such resins with an esterified phenolic resole as the ester functional hardening agent together with various bases, including oxides and hydroxides of magnesium and calcium.

U.S. Pat. No. 2,869,191 to R. H. Cooper of Jan. 20, 1959 relates to the use of active magnesium oxide for hardening phenolic resole resins.

U.S. Pat. No. 2,869,196 to R.H. Cooper of Jan. 20, 1959 relates to hardening of phenolic resole resins with active magnesium oxide and the use of blast furnace slag as the aggregate, U.S. Pat. No. 4,473,654 to Stenders of Sep. 25, 1984 relates to bonding of refractory aggregates such as periclase together with at least 5% of free calcium oxide with a lithium compound such as lithium fluoride, with or without temporary binding agents. The binding agents are non-aqueous.

SUMMARY OF THE INVENTION

It has been found that the ambient temperature hardening of compositions containing magnesia aggregate and a curable, liquid phenolic resin, either alone or together with an ester functional hardening agent, can be retarded by the use of certain additives. Such retarder additives include: tetraalkoxy silanes having from 1 to 3 carbon atoms in each alkoxy group, partially hydrolyzed tetraalkoxy silanes having 1 to 3 carbon atoms in each alkoxy group, 2'-, and 4'-hydroxyacetophenone (also referred to as 2- and 4-acetylphenol), 2- and 4-chlorophenol as well as compound which supply aspartate, fluoride, bifluoride, malate, oxalate, tartrate, citrate, phosphonate, and phosphate anions to the compositions and mixtures of the foregoing. The compositions of this invention are useful in the preparation of ceramics and various refractories such as refractory brick, castable shapes, ramming mixes, and impregnated refractory articles.

In one aspect of the invention, a binder-aggregate composition is provided. The binder-aggregate comprises a mixture of: (a) magnesia aggregate; (b) a curable phenolic resin solution wherein the resin is present in sufficient quantity to harden or decrease the flow of the mixture on standing at ambient temperature; (c) a retarder compound; and (d) optionally, an ester functional hardening agent and conventional additives used in refractory and ceramic compositions. Preferably the resin is present in sufficeint quantity to bind the aggregate on thermal curing of the resin.

In another aspect, the invention involves a method for making a binder-aggregate composition which comprises mixing the ingredients used in the above mentioned binder-aggregate composition. Preferably, the mixing produces a composition which is wet and shapable.

In still another aspect, a binder-aggregate composition of this invention containing a phenolic resole resin together with the magnesia aggregate is formed into a desired shaped article, and the article can be allowed to stand at ambient temperature to develop the requisite ambient temperature strength which is also referred to as green strength.

Still further aspects of the invention involve thermal curing of the shaped article and optionally heating at a still higher temperature to carbonize the resin binder to form a refractory body.

Extended mix life and working time provided by the retarders of this invention facilitate the making of refractory and ceramic mixes less frequently and/or production of larger batch mixes, thus increasing productivity. A retarder prolongs the ambient temperature working life of the hardenable composition so that it can be formed into the desired shape. Furthermore, the articles produced from these mixtures often show improved strength. The benefit in manufacture of refractory brick is particularly advantageous, especially during hot summer days. As the resin advances toward curing in the unpressed mix it leads to drying out of the mix which in turn leads to bricks with decreased room temperature green strength. The use of the binder-aggregate materials of this invention which contain a retarder inhibit or prevent this problem.

DETAILED DESCRIPTION OF THE INVENTION

The Phenolic Resin

The phenolic resin can be a novolac solution, a resole solution, a novolac in a resole solution or a mixture of the foregoing. Solid phenolic resin in contact with the magnesia aggregate does not cause the problem solved by this invention, namely, premature hardening of the binder-aggregate mixture. The problem is evident in a wet binder-aggregate mixture. Therefor a solvent for the phenolic solids is present in the binder-aggregate mixture of this invention.

The phenolic resole resin solutions which may be used in this invention can be that of phenol formaldehyde or those wherein phenol is partially or completely substituted by one or more phenolic compounds such as cresol, resorcinol, 3,5-xylenol, bisphenol-A, or other substituted phenols and the aldehyde portion can be partially replaced by a phenol reactive aldehyde such as acetaldehyde, furaldehyde or benzaldehyde.

Resole resins are thermosetting, i.e., they form an infusible three dimensional polymer upon application of heat and are produced by the reaction of a phenol and a molar excess of a phenol-reactive aldehyde typically in the presence of an alkali or alkaline earth metal compound as condensing catalyst. Typically, the resole resin will be a phenol-formaldehyde resin produced by reacting phenol and formaldehyde in a molar ratio (phenol: formaldehyde) within the range of from about 1:1 to 1:3. A preferred molar ratio for use in this invention ranges from about one mole of the phenol for each mole of the aldehyde to about 1 mole of phenol for 2.2 moles of the aldehyde and particularly a range of phenol to aldehyde of 1 to 1.2 to 1 to 2. The phenolic resole resin will usually be in aqueous solution. Preferred phenolic resole resins used in this invention have less than about 1% and preferably not more than 0.5% by weight of soluble sodium or potassium.

Resoles can be prepared with a variety of condensation catalysts. These include alkali and alkaline earth oxides and hydroxides, quaternary ammonium hydroxides, as well as ammonia and organic amines. It is preferable to have the retarder fully soluble and stable in the phenolic resin. In such case, particularly where the phenolic is a resole solution, the phenolic resin and the retarder can advantageously be placed in storage. A less desirable system is wherein a portion of the retarder is uniformly dispersed as a fine powder in the phenolic solution. Least desirable is when a portion of the retarder forms a precipitate which settles out upon storage. Alternatively, the retarder can be added to the binder-aggregate mixture or to the aggregate prior to addition of binder.

The preferred catalysts for resole formation in this invention are potassium hydroxide and amines because they produce little or no insoluble product upon addition of a water soluble fluoride or bifluoride salt or of an organic acid retarder. Illustrative of amine catalysts there can be mentioned triethylamine; ammonia; and hexamethylenetetraamine. Alkaline earth cations ($Ca^{++}$, $Mg^{++}$) produce an insoluble fluoride or bifluoride salt or an insoluble salt of a carboxylic acid retarder. Results similar to that with alkaline earth cations would be obtained with other divalent metal condensation catalysts. Soluble sodium in the resole is also not preferred because sodium fluoride and polysodium salts of malic acid, tartaric acid, and citric acid are often insoluble in preferred resoles of this invention. Soluble lithium in resole is satisfactory for use with organic acid retarders but not with fluoride or bifluoride as lithium fluoride has low solubility in resole or water for that matter. Tetraalkoxy silane retarders are preferably not added to resole solutions as undue hydrolysis will result due to the presence of water in the resin. However, some instability of a mixture of resin and retarder is acceptable if the solution of resin and retarder will be used within several hours after preparation. Based on physical compatibility, the preferred system is a potassium catalyzed resole using a retarder which provides to the composition a fluoride or bifluoride anion or citric acid, malic acid, tartaric acid or mixtures thereof as retarder.

The pH of the phenolic resole resin used in this invention will generally vary from about 4.5 to 9 or 9.5 with a pH of 5 to 8.5 being preferred. The molecular weight of the resin will vary from about 200 to 3,000 weight average molecular weight with 300 to 1,000 being preferred. All other things being equal, higher molecular weights and lower free-phenol content will provide shorter ambient temperature gel or hardening time and increase strength development with resole resins. The weight average molecular weight is measured using gel permeation chromatography and phenolic compounds and polystyrene standards. The sample molecular weight to be measured is prepared as follows: the resin sample is dissolved in tetrahydrofuran and slightly acidified with 1N hydrochloric or sulfuric acid and dried over anhydrous sodium sulfate. The salts which result are removed by filtration and the supernatant liquid run through a gel permeation chromatograph.

The resin solids in the resole resin solution can vary over a broad range such as that of about 50% to 90% by weight of the phenolic resole resin. Preferably, the resin solids vary from about 50% to 80% by weight of the phenolic resole resin. The viscosity of the resin, can vary over a broad range such as that of from about 100 to 10,000 cps at 25° C. Preferably, the viscosity varies from about 250 to 5,000 cps at 25° C. The viscosity measurements herein are given in centipoise (cps) as measured by a Brookfield RVF viscometer at 25° C. or by Gardner-Holt viscosities at 25° C. The Gardner-Holt viscosities which are in centistokes are multiplied by the specific gravity (generally 1.2) to give the cps at 25° C.

The quantity of free phenol in the resole resin can vary over a broad range such as from about 5% to 15% based on the weight of the resin (BOR). Increasing the quantity of free phenol increases the room temperature mix life of the hardenable binder-aggregate composition.

The liquid portion of the resole resin is water or water together with free phenol and optionally a non-reactive solvent. Solvents in addition to water can be selected from alcohols of one to five carbon atoms, diacetone alcohol, glycols of 2 to 6 carbon atoms, mono- and dimethyl or butyl ethers of glycols, low molecular weight (200- 600) polyethylene glycols and methyl ethers thereof, phenolics of 6 to 15 carbons, phenoxyethanol, ethyl acetate, butyl acetate, propylene glycol, dipropylene glycol, methyl ethyl ketone, methyl isobutyl ketone, cyclic ethers such as tetrahydrofuran and m-dioxolane, and the like.

Typical water contents for the resole resins used in this invention will vary from about 3% to 20% by weight of the resin (BOR). Preferably the water content of the resole resin is from about 3% to 15% BOR (based on the quantity of resole resin). Apart from water in the resin as manufactured, additional water can be mixed into the resin itself or the binder-aggregate composition. Preferably the total water content of the binder-aggregate composition varies from about 0.5% to 5% by weight. Increasing the water content of the resin or total water in the binder-aggregate composition decreases the ambient temperature mix life of the binder-aggregate composition.

The Novolac Resin

The novolac resin can be used as a liquid solution when used alone as the phenolic resin or as a liquid or solid when used together with a resole solution.

For use in this invention, the novolac will have a molecular weight of about 300 to 3,500. Solvents which can be used for dissolving the novolac include: ethylene glycol; furfuryl alcohol, diacetone alcohol, glycol ether acetate; glycol ether; and mixtures thereof as well as lower alcohols, e.g., methanol, ethanol, 1- and 2-propanol, 1-butanol and the like. Preferred novolac solids content will be from about 50% to 70% by weight of the novolac solution. Preferred viscosities for the novolac solutions are from about 2,000 to 6,000 cps at 25.C. However, ground or powdered novolac can be added to a resole solution for forming the binder-aggregate composition.

A novolac resin is one prepared with a deficiency in aldehyde so that when used alone, it is normally not curable unless a curing agent such as hexamethylenetetraamine ("hexa") is added together with heat for a thermal cure. A novolac resin may be defined as the generally acidic resinous reaction product of a phenolic material and an aldehyde that, for practical purposes, does not harden or convert to an insoluble, infusible condition upon heating but remains soluble and fusible.

By "novolac" herein is meant novolac resins, polymers, copolymers, terpolymers or mixtures comprising a phenolic material such as phenol, cresol, or xylenol or mixtures thereof reacted with formaldehyde or other commercially used reactants for production of novolacs such as benzaldehyde, furaldehyde, acetaldehyde and acetone. The formaldehyde: phenolic mole ratio of the novolacs useful in the present invention is in the range of about 0.5:1 to about 0.9:1, and preferably about 0.6:1 to 0.8:1, wherein the phenolic material is selected from phenol, o-, m-,and p-cresol, xylenols and mixtures thereof, Preferably, the novolac resin is prepared by condensing formaldehyde and phenol at a pH of less than about 4, and more preferably about 2.

Hexa and/or other methylene-generators, such as for example formaldehyde or paraformaldehyde, can be added to the novolac containing binders of the present invention. When used, hexa is added at a level of about 4% to about 15%, based on the weight of total novolac phenolic resin and more preferably at about 5% to about 10%. However, the novolac can also be cured in the presence of a resole since resoles use higher mole ratios of formaldehyde to provide excess methylol groups, some of which in turn can react with the novolac. When the binder-magnesia aggregate does not contain a resole it is preferred that the quantity of calcium oxide in the magnesia aggregate be from 1.5 to 4% by weight of the magnesia aggregate since the rate of hardening of the binder-aggregate increases with increased calcium oxide content.

The compositions of this invention can utilize a blend of novolac and resole components. By "component" herein is meant an individual resin of a blend, mixture, reaction product, or other combination of resins containing the novolac or resole of reference. Such resin binders also have the desirable properties of low thermal conductivity and high dimensional stability and abrasion resistance. When the hardenable (curable) composition contains both a resole and novolac binder, it is preferred that there be about 1 to 4 parts of resole by weight for each part of novolac. In such case it is also preferred that powdered novolac be added to the resole resin or binder-aggregate mixture.

The quantity of resin used in the binder-aggregate mixture is that which is sufficient to bind the aggregate on ambient temperature hardening in the case of a resole or to decrease the flowability of the mixture in the case a novolac is used alone at ambient temperature or to bind the mixture on thermal curing in the case the phenolic is a resole, a novolac or mixtures thereof. Thus, the quantity of resin based on aggregate in the binder-aggregate mixture can vary over a broad range such as from about 3% to 15% by weight of resin based on the weight of the magnesia aggregate and particularly from about 3% to 8% of resin based on the weight of magnesia aggregate. As used in this invention, "resoles" are solutions of the phenolic involved even though further referred to as "solutions" whereas "novolacs" are solids.

The Magnesia Aggregate

The magnesia aggregate can be either deadburned magnesia or hardburned magnesia. The hardburned and deadburned magnesia aggregates are simply also referred to herein as magnesia aggregate. Deadburned magnesia is also referred to as deadburned magnesite, refractory magnesia or periclase. To the refractories art, the terms "deadburned magnesite" or "deadburned magnesia" are used interchangeably to describe the dense, highly crystalline, periclase product of good stability, which is used to fabricate refractory brick and the like. Such magnesia products can be obtained from the Martin Marietta Magnesia Specialties Company under the designator of MAGCHEM Magnesium Oxide Products.

Reactivity and surface area of magnesium oxide (magnesia) differ greatly depending on the procedure used for manufacture of the magnesia. These magnesia products are made by calcining magnesite ($MgCO_3$) or such magnesium compounds as the hydrate, or chloride at different temperatures. Lightburned grades of magnesium oxide are prepared by calcining at temperatures ranging from about 1600° F. to about 1800° F. (871° C. to 982° C.). Hardburned and deadburned magnesia aggregates are prepared by calcining at substantially higher temperatures. Thus, hardburned and deadburned magnesia aggregates are prepared by calcining at temperatures of 2800° F. (1540° C.) and above. In one reference, namely Kirk-Othmer, Encyclopedia of Chemical Technology (John Wiley & Sons, NY, 1982] Vol 20 page 8 under the section on Refractories, both hardburned and deadburned magnesia aggregate appears to be treated the same since that reference states that deadburned magnesite is obtained by firing naturally occuring magnesium carbonate at 1540° C. to 2000° C. However, for the purposes of this application, the calcining temperatures set forth in a brouchure of Martin Marietta Magnesia Specialties Company entitled MAGCHEM Magnesium Oxide Grades and Uses will be employed wherein it states that hardburned grades are prepared by calcining at temperatures ranging from about 2800° F. to 3000° F. (1540° to 1649° C.) and that the deadburned grade of magnesium oxide is calcined at temperatures of over 4000° F. (2204° C.). There are also differences in surface areas for the various magnesias. Thus, lightburned magnesia has a surface area of about 10 to 200 or more square meters per gram. Hardburned magnesia and deadburned magnesia have a surface area of about one or less than one square meter per gram.

Commercially available magnesia aggregate commonly analyzes from about 91% to over 99% of MgO and preferably 96 to over 99% of MgO with not more than 4% of CaO by weight as the main impurity and preferably the magnesia aggregate will contain not more than 3.50% of CaO. As the quantity of lime (CaO) increases, the mix life in the binder-magnesia aggregate decreases. Illustrative of a suitable hardburned magnesia aggregate there can be mentioned MAGCHEM. 10-40 which has a 98.2% MgO content on an ignited basis, 0.25% loss on ignition, 0.90% CaO, and smaller quantities of other oxides with 96% of the product passing a —40 U.S. Sieve with a median particle size of 30 microns and a surface area of less than 1 square meter per gram.

For use in refractory compositions, the magnesia grain is crushed and sized in various fractions. Commonly used grain sizes of deadburned or hardburned grades of magnesia can be used in this invention. A typical mixture of coarse, intermediate and fine grain fractions of deadburned magnesia suitable to achieve high bulk density and low porosity, such as for use in manufacture of refractory articles useful in basic oxygen process furnaces, will have Tyler standard screen sizes as follows: 30 to 35% passing 4 mesh and retained on 10 mesh; 30 to 40% passing a 6 mesh and retained on 28 mesh; and 30 to 35% ball mill fines (less than 100 mesh). Magnesia aggregate used in this invention preferably contains from about 10% to 25% of such aggregate which is ground to a powder.

By the term "room temperature hardening" we mean the hardening of binder-aggregate compositions of this invention at temperatures of about 60° F. to 90° F., particularly about 65° F. to 80° F. However, the use of retarders in the processes and compositions of this invention retard the hardening at lower and higher temperatures such as 60° F. to 110° F., such temperatures being referred to herein as ambient temperatures. Gellation or hardening of resole resins, even in the absence of magnesia aggregate, at ambient temperatures are the first steps toward curing. Nevertheless, when the novolac is in contact with magnesia aggregate at ambient temperature, there is a viscosity increase, decreased flow or simply hardening of the binder-aggregate composition of this invention. In addition to hardening at ambient temperature, the binder-aggregate compositions of this invention can be thermally cured after ambient temperature hardening or the compositions can be thermally cured prior to such hardening. The term "thermal curing" as used herein means curing of the composition at a temperature of at least 170° F. (77° C.) such as up to 248° F. (120° C.) and generally at a temperature of at least 212° F. (100° C.).

The Ester Hardening Agent

The ester functional hardening agent accelerates the hardening of the phenolic resin in the binder-magnesia aggregate compositions of this invention. The ester functionality can be provided by lactones, cyclic organic carbonates, carboxylic acid esters, or mixtures thereof. Generally, low molecular weight lactones are suitable as the ester functional hardening agent, e.g., beta or gamma-butyrolactone, gamma-valerolactone, caprolactone, beta-propiolactone, beta-butyrolactone, beta-isobutyrolactone, beta-isopentyllactone, gamma-isopentyllactone, and delta-pentyllactone. Examples of suitable cyclic organic carbonates include, but are not limited to: propylene carbonate; ethylene carbonate; 1,3-butanediol carbonate; 1,2-pentanediol carbonate; and 1,3-pentanediol carbonate.

The carboxylic acid esters which can be used in this invention include phenolic esters and aliphatic esters. The aliphatic esters are preferably those of short or medium length, e.g., about 1 to 4 carbon mono- or polyhydric, saturated or unsaturated alcohols with short or medium chain length, e.g., about 1 to 10 carbon aliphatic, saturated or unsaturated carboxylic acids which can be mono- or polycarboxylic. The preferred aliphatic esters are those of alkyl, mono-, di-, or trihydric alcohols with alkyl, or mono-, or diunsaturated acids which can be mono, di-, or tricarboxylic.

As to aromatic esters, such esters can be obtained by esterifying the aromatic, e.g., phenolic group or groups of a mono- or polyhydric aromatic phenol to prepare a formate or acetate ester of such aromatic compound. Additionally, the aromatic ester can be an esterified phenolic compound containing one or more phenolic hydroxyl groups and/or one or more esterified phenolic hydroxyl groups and further containing one or more esterified methylol groups positioned ortho and/or para to a phenolic hydroxyl group or esterified phenolic hydroxy group. Such phenolic esters and their method of manufacture are disclosed in International Application No. PCT/GB89/01526 having a filing date of Dec. 21, 1989 to Lemon et al.

It will be understood that the esterified phenolic compound used may be a mono-, di- or polynuclear phenol wherein at least one esterified methylol group is attached to an aromatic ring carbon atom ortho or para to a phenolic hydroxyl group or esterified phenolic hydroxyl group. The acid portion of the phenolic esters can be the same as those of the aliphatic esters.

Specific carboxylic acid esters include but are not limited to: n-butyl formate; ethylene glycol diformate; methyl and ethyl lactates; hydroxyethyl acrylate; ethylene glycol diacetate; triacetin (glycerol triacetate); diethyl fumarate; dimethyl maleate; dimethyl glutarate; dimethyl adipate; 2-acetyloxymethyl phenol; 2-methacryloxymethyl phenol; 2-salicyloxylmethyl phenol; 2-acetyloxymethyl phenol acetate; 2,6-diacetyloxymethyl p-cresol acetate; 2,4,6- triacetyloxymethyl phenol; 2,4,6-triacetyloxymethyl phenol acetate; 2,6-diacetyloxymethyl phenol acetate; 2,2',6,6'-tetraacetyloxymethyl bisphenol A; and 2,2',6,6'-tetraacetyloxymethyl bisphenol A diacetate. Also suitable are: cyanoacetates derived from 1 to 5 carbon atom aliphatic alcohols; formates and acetates of benzyl alcohol, alpha,alpha'-dihydroxyxylenols, phenol, alkyl substituted phenols, dihydroxybenzenes, bisphenol A, bisphenol F , and low molecular weight resoles. At times, it is advantageous to use mixtures of the ester functional hardening agents.

The ester functional hardening agent is present in an amount sufficient to increase the tensile and compressive strength of the ambient temperature hardened composition. Such quantity of the ester also increases the rate of hardening of such compositions. The quantity of ester used in the binder aggregate compositions of this invention will vary over a broad range such as that of about 5% to 25% by weight of the phenolic resin and preferably from about 5% to 15% by weight of the resin. The exact quantity will depend on the particular ester hardener used, the amount and specific magnesia aggregate used, the temperature at which the composition is used or stored, and desired results.

The Retarders

The retarders used in this invention include hydrogen fluoride, hydrogen bifluoride, phosphoric acid, 2- and 4-acetylphenol, 2-, and 4-chlorophenol, tetraalkoxy silanes having from 1 to 3 carbon atoms in each alkoxy group as well as hydrolysates of such silanes, phosphoric acids, malic acid, oxalic acid, tartaric acid, aspartic acid (2-aminosuccinic acid), phosphonic acids and citric acid as well as salts thereof such as those which have a water solubility of at least 0.1% and preferably at least 2% by weight at 25.C so that the retarder compound can provide anions, e.g. citrate, to the compositions. Some of the retarders are strong acids and care needs to be exercised to keep the binder-aggregate at a pH of about 4 or above. Otherwise, acid catalysis of the phenolic may take place and prematurely harden the binder-aggregate composition.

As described in my copending U.S. patent applications Ser. No. 562,206 which was filed on Aug. 2, 1990, and Ser. No. 698,945 which was filed on May 13, 1991 and which are incorporated herein by reference, for ionizable compounds, it is the anion, e.g., $F^-$ which determines whether these materials are retarders. Thus, the cation, e.g., $Na^+$, $H^+$, $K^+$ does not change the anion from being a retarder, although it may have some effect on the amount of retardation in that there would normally be less retardation for compounds having less water solubility. In the case of ionizable retarder compounds, such compounds provide the retarder anions to the composition. For this, some solubility in the composition, e.g. binder-aggregate or water, is needed. Thus, the fluoride in calcium fluoride is not available as a retarder due to the low water solubility of this compound. However, some compounds which do not appear to ionize are also retarders. Such retarders include the tetraalkoxy silanes.

A benefit of using ammonium or an amine salt of an acid is that it is more soluble than sodium or potassium salts. To prevent too low of a pH, which could lead to acid catalyzed polymerization, partial neutralization by an amine permits higher levels of acid to be used. Premature precipitation of salt, e.g., disodium citrate or disodium tartrate produces a heterogeneous mixture which affects retardation unevenly. Thus, the bottom of a container of such heterogenious mixture would have a higher concentration of retarder. The salts of the retarders are advantageously that of amines. Illustrative of such amines there can be mentioned: N,N-dialkylethanolamines having from 1-3 carbon atoms in each alkyl group and preferably 1 to 2 carbon atoms; c-and p-dialkylaminmethyl phenol having from 1 to 2 carbon atoms in each alkyl group; N,N-dimethylbenzylamine; N-alkylpiperidine having from 1 to 2 carbon atoms in each alkyl group; N-methyl or N-ethylmorpholine; N,N-dimethylethanolamine; N,N-diethylethanolamine; and the like. The foregoing amines are tertiary amines. Primary and secondary amines can be used with acidic retarders where there is no undue destabilization of resin relative to the use of a tertiary amine. In any event, primary and secondary amines should be avoided when an organic ester is in the binder-aggregate composition as a hardening agent. Illustrative of primary and secondary amines for preparing salts of the acidic retarders there can be mentioned: ethanolamine and its N-monomethyl and its N-monoethyl derivatives; 1- and 2-aminopropanols; N-methyl benzylamine; morpholine; piperidine and diethanolamine.

Retarder anions used in this invention are aspartate; bifluoride; citrate; fluoride; malate; oxalate; tartrate; phosphate; and phosphonate. Preferably, the retarder anion is combined with hydrogen as the cation or cations and used in the acid form of the compound, e.g., as in citric acid. Also preferred are cations of the alkali metals, ammonium, and lower alkyl substituted ammonium having from 1 to 4 carbon atoms in each alkyl group.

The tetraalkoxy silanes used as retarders in this invention have from 1 to 3 carbon atoms in each alkoxy group. Also operable are partially prehydrolyzed tetraalkoxy silanes of 1 to 3 carbon atoms in each alkoxy group wherein the degree of hydrolysis of such compound can vary over a wide range such as up to about 60%. The alkoxy group in these silanes can be the same or different.

Illustrative of specific retarder compounds, there can be mentioned: ammonium bifluoride; ammonium fluoride; ammonium phosphate (monobasic); phosphoric acid; potassium fluoride; sodium fluoride; sodium phosphate (monobasic); sodium phosphate (tribasic); citric acid; sodium citrate; the mono- and di-salts of N,N-dialkylethanolamine wherein each alkyl group has from 1 to 3 carbon atoms with citric acid; potassium tartrate; tartaric acid; malic acid; aspartic acid; and phosphoric acid. Illustrative of organic phosphonic acids there can be mentioned di-, and polyphosphonic acids, amine derivatives thereof and salts thereof, e.g., the DEQUEST (R.T.M.) series sold by Monsanto Co. such as DEQUEST 2000, phosphonic acid, [nitrilotris (methylene)]tris.

Malates, tartrates and citrates such as in malic acid, citric acid and salts thereof show unusual properties as retarders in that they display an initial thixotropy. This can be beneficial in that it affords higher initial green strength (ambient temperature hardening) of the composition coupled with extended mix life.

The quantity of retarder used in this invention is an amount or quantity sufficient to decrease the rate of ambient temperature viscosity increase, gelation and hardening of the binder-aggregate material and such quantity can vary over a wide range depending on the activity of the particular retarder, the amount of retardation desired, the room or ambient temperature, the quantity of calcium oxide in the composition (generally as an impurity in the magnesia aggregate) and whether an ester hardening agent is also used. Thus the quantity of retarder will generally vary from about 0.1% to 6% by weight of the phenolic resin. Preferred usage levels for various retarders are: 0.1% to 1.0% for fluoride or bifluoride; 0.5% to 2.5% for phosphoric acid, the silanes and the polycarboxylic acid retarders; and 2% to 5% for the substituted phenols. All of these usage levels are based on the weight of the phenolic resin, also referred to as "BOR".

Fillers, Aggregates and Modifiers

The compositions of this invention can include fillers, modifiers, and aggregates, in addition to the magnesia aggregate, such as those which are conventionally used with phenolic resins. The additional aggregate material may be a particulate material such as that in granular, powder, or flake form. Suitable additional aggregate materials include but are not limited to: magnesite, alumina, zirconia, silica, zircon sand, olivine sand, silicon carbide, silicon nitride, boron nitride, bauxite, quartz, chromite, and corundum and mixtures thereof.

The binder-aggregate compositions produced by combining the curable resin binder, magnesia aggregate, and retarder may additionally comprise any of a number of optional modifiers or additives including: non-reactive solvents; silanes; hexamethylenetetraamine; clays; graphite; iron oxide; carbon pitch; silicon dioxide; metal powders such as aluminum, magnesium, and silicon; surfactants; dispersants; air detraining agents; and mixtures thereof.

Applications

The methods and compositions of this invention can be used to prepare refractory or ceramic articles. They are particularly useful in: preparing shaped articles such as bonding deadburned magnesia for the manufacture of bricks and castable monolithic shapes. In the case of castable articles, the binder-aggregate mixture is generally less viscous and contains more resin as compared to that for refractories such as brick. Depending on the desired use, other ingredients can be added to the compositions. The amount of graphite in binder-aggregate compositions for refractory use generally varies from about 5% to 35% by weight of the magnesia aggregate. The quantity of metal powder such as aluminum, magnesium, and silicon will generally vary from about 1% to 5% by weight of magnesia aggregate.

Mixing of the ingredients for the binder-aggregate compositions of this invention may be accomplished in any means known in the art, i,e., using any industrial mixer such as an Eirich mixer, a Simpson mixer, a Muller mixer, and the like. The binder aggregate mixture which results from the mixing step may be molded by any technique known in the art and subjected to pressure to form a desired shape. The binder in the binder-magnesia aggregate composition will wet the aggregate so that the composition becomes shapeable or can fill out a mold such as by vibration. For example, the binder-aggregate may be subjected to compression, isostatic pressing, transfer molding, extrusion, or injection molding at desired temperatures and pressures. Following shaping the shape may be permitted to harden at ambient temperature or it may be further hardened by thermally curing before or after ambient temperature hardening. A typical heat treatment involves a continual increase in temperature up to about 120° C. (248° F.) to 205° C. (400° F.) to effect thermal cure of the resin binder and evaporate off water and organic solvent. Further heat treatment up to 800° C. to 1,000° C. further promotes carbonization of the resin binder.

In the case of refractories such as brick, the binder-magnesia aggregate composition is pressed into the desired shape and then thermally cured. At times, there is a delay after preparing the composition and before pressing it into the desired shapes with subsequent thermal curing such as at temperatures of about 230° F. (110° C.). Such delay can be of a few minutes or it can last over a period of a day or two. During such delay, the binder composition will increase in viscosity and become drier. Subsequent pressing of such binder into a shaped article such as brick and thermal curing produces articles having diminished strengths and/or which require more pressure cycles to compact to the desired density. The addition of a retarder slows the viscosity increase and provides pressed and thermally cured articles with greater ultimate tensile strength.

In some refractory applications, prefabricated forms, other than brick-like shapes, are required. These "monolithic refractories" are cast by placing a viscous but flowable binder-aggregate system into a mold and then filling out the mold by using vibration. Once the binder-aggregate system is room temperature hardened, the mold is stripped away so that the shape can be thermally cured and readied for use, either before or after transporting the monolithic refractory to its place of use. The retarders of the present invention provide increased working time for filling out the mold and compaction of the composition. After room temperature hardening, the monolithic can be thermally cured or carbonized, preferably at the site of use such as part of a furnace lining.

In order that those skilled in the art may more fully understand the invention presented herein, the following procedures and examples are set forth. All parts and percentages in the examples, as well as elsewhere in this application, are by weight, unless otherwise specifically stated.

RESIN CHARACTERIZATION

Resin A. This resole resin was prepared by charging a mole ratio of formaldehyde to phenol of 0.93 in the presence of an alkaline catalyst. Resin A had a viscosity of 5100 cps at 25° C.; a 3% by weight water content; a 22.7% by weight phenol content; 80% by weight solids; and a pH of 8.0. It should be noted that although the formaldehyde to phenol ratio charged to the reactor was less than 1, the amount of formaldehyde reacted with the phenol was substantially greater than one due to the large quantity of unreacted phenol in the resin.

Resin B. This resole resin was prepared by charging a mole ratio of formaldehyde to phenol of 1.20 in the presence of an alkaline catalyst. Resin B had: a viscosity of 4,100 cps at 25° C.; a water content of 7.9 %; a free phenol content of 14.6%; a solids content of 79%; an approximate weight average molecular weight of 566, excluding the free phenol ; and a pH of 7.9.

Resin C. This resole resin was prepared by charging a mole ratio of formaldehyde to phenol of 1.25 in the presence of an alkaline catalyst. Resin C had the following properties: a viscosity of 3,000 cps at 25° C.; 7.6% of water; 13% of phenol; 78% solids; an approximate weight average molecular weight, excluding the free phenol, of 406; and a pH of 7.8.

Resin D. This resole resin was prepared by charging a mole ratio of formaldehyde to phenol of 1.25 in the presence of an alkaline catalyst. Resin D had the following properties: a viscosity of 3,000 cps at 25° C.; 9.7% of water; 11% of free phenol; 77% solids; an approximate weight average molecular weight of 536, excluding the free phenol; and a pH of 7.9.

Preparation of Resin D. A solution of 3.621 kg (38.55 moles) of phenol was reacted with 2.885 kg of 50% formalin (48.08 moles) and 38 g of 50% sodium hydroxide at 60°–75° C. over 50 minutes. The reaction was then heated at 90°–92° C. for 40 minutes and then cooled to 60° C. at which time vacuum distillation was started at 26 inches of mercury. Approximately 31% of distillate was removed. The residue was heated at 75° C. for several hours until a viscosity of 3,000 cps at 25° C. was reached. This resin is further characterized above under the heading of Resin Characterization.

Preparation of Resin B. Resin B is prepared in much the same manner as Resin D using a formaldehyde/phenol mole ratio of 1.20, but was advanced to a slightly higher molecular weight and higher viscosity at essentially equal solids.

Preparation of Resin E. This resole resin was prepared in a similar manner to Resin B by replacing sodium hydroxide catalyst with 80 mole% of potassium hydroxide. Resin E had: a viscosity of 3900 cps at 25° C.; 6.4% of water; 14% of free phenol; 79% solids; and approximate weight average molecular weight of 370 (including free phenol); and a pH of 7.9.

Preparation of Resin F. This resole resin was prepared by charging a mole ratio of formaldehyde to phenol of 0.95 in the presence of hexamethylenetetraamine as catalyst . Resin F had: a viscosity of 800 cps at 25° C. 10.9% of water; 12.6% of free phenol; 14% of methanol; 69% solids; and approximate weight average molecular weight of 278 (including the free phenol); and a pH of 8.0.

PROCEDURE FOR DETERMINING EFFECT OF RESIN, SOLVENT, AND RETARDER ON VISCOSITY OF PHENOLIC RESIN D/HIGH PURITY MAGNESIA

This procedure is also referred to herein as "Procedure A". Ninety g (grams) resin were intimately mixed with: 72 g powdered (to pass 200 mesh U.S. Sieve Series screen) High Purity magnesia. The term "High Purity" magnesia refers to deadburned magnesia having a 99+% content of MgO and 0.59 Ca% which, as CaO, amounts to 0.82% by weight and has the particles size set forth in the previous sentence. This mixture of resin and magnesia was then transferred to a 4 ounce bottle. Brookfield viscosity of freshly prepared mixture was taken at zero hour and then the closed bottle and contents were tumbled at about 32 revolutions per minute at 25° C. +/− 1° C. Viscosities were taken initially and at intervals of 3, 6, 24, and 48 hours whenever possible. Samples were immersed in a constant temperature bath at 25° C. one hour prior to determining viscosity. Samples were intimately stirred immediately prior to measuring viscosity. This procedure is also referred to as "Procedure A" herein.

PROCEDURE FOR DETERMINING EFFECT OF ADDITIVES ON QUALITATIVE FLOW OF PHENOLIC RESIN/MAGNESIA AGGREGATE MIXES

This procedure is also referred to as "Qualitative Flow Procedure". Glass vials (28 mm×57 mm) were charged with 5.0 g resin, additive and solvent, if any, and after solution was effected, 4.0 g of the High Purity magnesia or if specifically recited "Standard Grade" magnesia, which was mixed well for one minute with a spatula and then mixed for another minute using an S/P Vortex Mixer of American Scientific Products at a setting of 9-10. The term "Standard Grade" magnesia is used herein to describe deadburned magnesia containing about 92% of MgO and 2.48% CaO (1.77% Ca) by weight having the same particle size set forth for High Purity magnesia in the Procedure A hereinabove. Relative viscosities of the mixes, with sets of 2 to 5 being compared simultaneously, were observed by laying at right angles, i.e. on their sides, at various intervals upon standing at room temperature (23°-25° C.). All mixes were quite fluid initially but generally became immobile and tack-free in 1 to 7 days. Immobile mixes were probed with an applicator stick to determine relative degree of tackiness which range from sticky initially, to taffy-like and then to tack-free (i.e., the stick pulls out clean and free of resin). As the viscosity of a fluid mix increases the mix becomes immobile. Further increases in viscosity are then shown by stickiness of the immobile mixture to the applicator stick. Still further viscosity increase is evidenced by a taffy-like tackiness and an even more advanced viscosity is evidenced by withdrawing the applicator stick clean and free of the mixture. Additionally, comparative viscosity increases were recorded, e.g., 3>2>1 means that the viscosity of Mix 3 was higher or greater than (>) that of Mix 2 which in turn was greater than Mix 1. The use of more than one greater than symbol "(>)" indicates a greater difference, i.e., viscosity increase, as compared to the use of simply one "(>)" symbol. The mixtures which did not contain an additive are also referred to as "Controls".

EXAMPLE 1

Effect of Water and Phenol on Viscosity of Phenolic Resole/High Purity Magnesia

This example was performed in accordance with the above described Procedure A using different resole resins with or without the addition of water or free phenol, as indicated, to the various mixes.

The results of this example are shown in Table 1. The entries of added water and added phenol in the table indicate the instances wherein an addition was made to modify the total quantity of water or free phenol in the resin to that indicated in the table. The quantity of water or phenol in the table is thus the total quantity of water for those samples in which there was an addition. The viscosity readings need to be multiplied by 1,000 as can be seen by the designator $10^3$. Thus, the reported viscosity of 1.68 as shown at zero hours for Mix 1 is 1680 cps at 25° C. Resin A was used in Mixes 1, 2 and 3 whereas Mixes 4 and 5 used Resin B. The column designated "No MgO" shows the viscosity of the Mix without addition of the magnesia aggregate.

It can be seen from Table 1 that increasing the amount of water increased the rate of viscosity increase whereas increasing the amount of free phenol decreased the rate of viscosity build up.

TABLE 1

EFFECT OF WATER AND PHENOL ON VISCOSITY OF PHENOLIC RESOLE/HIGH PURITY MAGNESIA

| Mix | water added For Total | Phenol added For Total | Viscosity (25°C.) CPS × $10^3$ | | | | |
|---|---|---|---|---|---|---|---|
| | | | No MgO | 0 hrs | 3 hrs | 6 hrs | 24 hrs |
| 1 | 8.1 | — | 0.675 | 1.68 | 4.40 | 6.70 | 25.75 |
| 2 | 5.5 | — | 1.55 | 3.76 | 6.10 | 7.60 | 19.75 |
| 3 | — | — | 5.25 | 17.25 | 15.00 | 16.25 | 20.00 |
| 4 | — | 22.6 | 2.25 | 7.50 | 18.00 | 27.25 | 110.00 |
| 5 | — | — | 5.60 | 22.00 | 69.00 | 119.0 | >400 |

EXAMPLE 2

Effect of Additives on Viscosity of Resin B/High Purity Magnesia Mixtures

This example was performed in accordance with the above described Procedure A. The column designated "No MgO" shows the viscosity of the mix without addition of the magnesia.

In this example Mix 1 did not contain an additive. Mix 2 contained 1.37% malic acid BOR (based on resin). Mix 3 contained 0.25% ammonium bifluoride BOR and 0.38% of water BOR. Mix 4 contained 1.4% of salicylic acid BOR. Mix 5 contained 1.4% of salicylic acid BOR and 1.4% of sodium salicylate BOR.

The results of this example are shown in Table 2. It can be seen from Table 2 that the viscosity increase of Mixes 2 and 3 were retarded in relation to the Control (Mix 1) which did not contain an additive and in relation to Mixes 4 and 5 wherein the additives had no retarding effect. One of the unexpected results of the experiment is that salicylic acid (Mix 4) showed no retarding effect in contrast to that shown with light burned magnesia in my copending U.S. patent application Ser. No. 698,945 which was filed on May 13 1991. Use of hardburned magnesia in place of the deadburned magnesia will show the same effects.

TABLE 2

EFFECT OF ADDITIVES ON VISCOSITY OF RESIN B/HIGH PURITY MAGNESIA

| Mix | Viscosity (25° C.) CPS × $10^3$ | | | | | | |
|---|---|---|---|---|---|---|---|
| | No MgO | 0 Hrs. | 3 Hrs. | 6 Hrs. | 24 Hrs. | 48 Hrs. | 72 Hrs. |
| 1 | 4.40 | 17.75 | 56 | 92 | >400 | — | — |
| 2 | 4.50 | 28.75 | 40 | 42 | 62 | >400 | — |
| 3 | 3.30 | 14.00 | 14.25 | 15.00 | 23 | 27.75 | 34.0 |
| 4 | 4.30 | 16.5 | 73.0 | 136 | >400 | — | — |
| 5 | 5.15 | 22.75 | 81.00 | 142 | >400 | — | — |

EXAMPLE 3

Effect of Acetic Acid or Formic Acid Additives on Qualitative Flow of Resin C/High Purity Magnesia This example was performed to test the comparative effect of acetic acid in Mix 2 and formic acid in Mix 3 in relation to the Control, Mix 1, which did not contain an additive. The tests were performed in accordance with the hereinabove described Qualitative Flow Procedure. Each of the mixes contained 0.2 g of ethylene glycol and the quantity of acetic acid or formic acid in each Mix was 0.06 g which is 1.2% based on the weight of resin.

It can be seen from Table 3 that both acetic acid and formic acid accelerate hardening and that formic acid was a more effective hardener as compared to acetic acid.

TABLE 3
EFFECT OF ACETIC ACID OR FORMIC ACID ADDITIVES ON QUALITATIVE FLOW OF RESIN C/HIGH PURITY MAGNESIA

| Hours Elapsed | Order of Viscosity Increase For the Various Mixes |
| --- | --- |
| 0.5–1 | 3>2>1 |
| 3 | 3>2>>1 |
| 5 | 3>>2>>1 Mix 1 is still quite fluid. |
| 24 | 3>2>>>1 Mix 1 is still fairly fluid. |
| 34 | 3 is non-tacky. Mix 2 is still tacky. |
| 47 | Mix 1 is still flowable. |
| About 59 | Mix 2 is non-tacky. |
| 96 | Mix 1 is slightly mobile, sticky. |

EXAMPLE 4

Effect of Glycolic, Lactic and Malic Acids on Qualitative Flow of Resin C/High Purity Magnesia This example was performed in accordance with the Qualitative Flow Procedure to test the comparative effect on viscosity of Mix 2 which contained glycolic acid (hydroxy acetic acid) at a concentration of 1.1% BOR; Mix 3 which contained lactic acid (2-hydroxypropionic acid) at 1.2% BOR ; and Mix 4 which contained malic acid (hydroxysuccinic acid) at 1.2% BOR; in relation to Mix 1 which did not contain an additive.

It can be seen from Table 4 that glycolic and lactic acid enhance viscosity increase, i.e., they acted as accelerators. Malic acid shows an apparent initial thixotropic effect but in reality retards viscosity increase.

TABLE 4
EFFECT OF GLYCOLIC, LACTIC AND MALIC ACIDS ON QUALITATIVE FLOW OF RESIN C/HIGH PURITY MAGNESIA

| Hours Elapsed | Order of viscosity Increase Of the Various Mixes |
| --- | --- |
| 1–6 | 4>>2>3>1 |
| 23 | 2,4>>3>1 |
| 24 | 2>3>>1>>>4 Mix 2 is immobile but still tacky. Remixed all the samples after 24 hrs. |
| 72 | Mix 4 still shows flow |

Following the procedure of Example 4 but using hardburned magnesia or Standard Grade magnesia instead of High Purity magnesia the malaic acid will show its retarding effect on the composition.

EXAMPLE 5

Effect of Edta-Disodium-Monohydrate, Malic Acid and Tartaric Acid on Qualitative Flow of Resin C/High Purity Magnesia This example was performed to test the comparative effect of: Mix 2 which contained EDTA-disodium-H$_2$O at 1.6% BOR; Mix 3 which contained malic acid at 1.4% BOR; Mix 4 which contained tartaric acid at 1.4% BOR; in comparison with Mix 1 which did not contain an additive. This example was conducted in accordance with the Qualitative Flow Procedure described hereinabove. The results of this example are shown in Table 5.

It can be seen from Table 5 that malic and tartaric acids are effective retarders whereas EDTA-disodium-monohydrate is a modest retarder.

TABLE 5
EFFECT OF EDTA-DISODIUM-MONOHYDRATE, MALIC ACID AND TARTARIC ACID ON QUALITATIVE FLOW OF RESIN C/HIGH PURITY MAGNESIA

| Hours Elapsed | Order of Viscosity Increase of the Various Mixes |
| --- | --- |
| 1–3 | 1 equal to or slightly greater than 2>3>4. The samples were remixed after 3 hours. |
| 11–24 | 1>2>>3 equal or slightly greater than 4. Stoped Mix 2. |
| 28 | 1>>3,4 |
| 48 | 1>>>3>4 Mix 4 still flows quite freely. |
| 72 | 1>>>3>>>4 Mix 4 still flows quite freely. |
| 96 (4 days) | Mix 1 is approaching tack-free. |
| 144 (6 days) | Mix 4 still flows whereas Mix 1 is tack-free. |
| (8 days) | Mix 3 is tack-free whereas Mix 4 is not. |

Following the procedure of this Example 5, the use of citric acid in place of the tartaric acid will retard the hardening of the composition in the same manner as the tartaric acid. Also, the use of hardburned magnesia or Standard Grade magnesia in place of the High Purity magnesia will produce the same effects.

EXAMPLE 6

Effect of Malic Acid and a Mixture of Malic Acid and 4′-Hydroxyacetophenone on Qualitative Flow of Resin B/High Purity Magnesia This example was performed in order to test the comparative effect on Resin B of a mixture of malic acid at 1.2% BOR in Mix 1 with Mix 2 which contained 1.2% BOR of malic acid together with 4′-hydroxyacetophenone at 4% BOR. This example was conducted in accordance with the Qualitative Flow Procedure set forth hereinabove.

It can be seen from Table 6 that 4′-hydroxyacetophenone increases mix viscosity initially but ultimately retards. Substitution of 2′-hydroxyacetophenone in place of the 4′-hydroxyacetophenone in this example will give similar results.

TABLE 6
EFFECT OF MALIC ACID AND A MIXTURE OF MALIC ACID AND 4′-HYDROXYACETOPHENONE ON QUALITATIVE FLOW OF RESIN B/HIGH PURITY MAGNESIA

| Hours Expired | Order of Viscosity Increase of the Various Mixes |
| --- | --- |
| 1/6–2.5 | 2>1 Remixed after 2.5 hours. |
| 4 | 2>>1 Mix 2 moves very slowly. |
| 6–20 | 2>>1 Remix after 20 hours. |
| 20 | 2 is the same as 1. |
| 26 | 2 is equal or slightly greater than 1. |
| 48–96 | 1>>2 After 4 days Mix 2 still flowed fairly well. |
| 114 (6 days) | Mix 1 is tack free whereas Mix 2 is not. |

EXAMPLE 7

Effect of Adipic Acid, Succinic Acid and 4-Nitrophenol of the Flow of Resin D/High Purity Magnesia This example was performed in accordance with the Qualitative Flow Procedure to test the comparative effect of: Mix 2 containing adipic acid at a concentration of 1.6% BOR; Mix 3 containing succinic acid at a concentration of 1.6% BOR; and Mix 4 containing 4-nitrophenol at a concentration of 4% BOR; in relation to Mix 1 which did not contain additive.

The results of the tests are set forth in Table 7. It can be seen from Table 7 that adipic acid, succinic acid and 4-nitrophenol act as viscosity accelerators. Similar results are obtained by use of hardburned magnesia in place of the deadburned magnesia in this example.

TABLE 7

EFFECT OF ADIPIC ACID, SUCCINIC ACID AND 4-NITROPHENOL ON THE FLOW OF RESIN D/HIGH PURITY MAGNESIA MIXTURE

| Hours Expired | Order of Viscosity Increase or the Various Mixes |
|---|---|
| 1 | 2 >3>4 which is equal or slightly greater than 1. |
| 4 | 2 >3>4>1. |
| 6 | Mix 2 moves very slowly. |
| 23 | Mixes 2 and 3 show no flow and are tack-free, Mix 1 shows slight flow and Mix 4 shows no flow but is not tack-free. |
| 47 | Both Mixes 1 and 4 are tack-free but Mix 4 is slightly firmer. |

EXAMPLE 8

Effect of Glutamic Acid, Malic Acid and Mixtures of Malic Acid with 2-Chlorophenol on the Flow of Resin D/High Purity Magnesia This example was performed with Resin D in accordance with the hereinabove described Qualitative Flow Procedure.

It was found that glutamic acid at a concentration of 1.6% BOR showed equivalent results to the Control after 0.5 and 23 hours.

Comparison of mixes containing malic acid at a concentration of 1.2% BOR and a mixture of 2-chlorophenol at a concentration of 4% BOR with malic acid at a concentration of 1.2% BOR were compared with each other. The addition of 2-chlorophenol to malic acid extended the mix life relative to malic acid alone at time intervals of 5 minutes through 48 hours. After 48 hours the malic acid mix is tack-free (stick is clean) whereas the mix with chlorophenol and malic acid is not. Substitution of ammonium malate in place of the malic acid in this example will give similar results.

From Example 8 it can be concluded that glutamic acid shows little or no effect on viscosity whereas 2-chlorophenol retarded the increase of viscosity in the mix.

EXAMPLE 9

Effect of Malic Acid, Magnesium Hydrogen Malate, Mixture of Malic Acid with Monoammonium Malate, Mixture of Malic Acid with 4'-Hydroxyacetophenone and Mixture of Malic Acid with 2'-Hydroxyacetophenone on the Flow of Resin D/High Purity Magnesia This example was performed in two parts and in accordance with the Qualitative Flow Procedure described hereinabove. In the first part, tests were made to determine the comparative viscosity changes effected by Mix 1 containing malic acid at a concentration of 1.4% BOR in relation to Mix 2 containing magnesium hydrogen malate at a concentration of 1.9% BOR. In the second part of the example, tests were run to compare viscosity changes of: Mix 3 containing malic acid at a concentration of 1.4% BOR in admixture with monoammonium malate at a concentration of 2.4 % BOR; Mix 4 containing a mixture of malic acid at a concentration of 1.4% BOR with 4'-hydroxyacetophenone at a concentration of 4% BOR; and Mix 5 containing malic acid at a concentration of 1.4% BOR admixed with 2'-hydroxyacetophenone at a concentration of 4% BOR. The results of these tests are shown in Table 9. It can be seen from Table 9 that magnesium hydrogen malate relative to malic acid initially increases viscosity but after 1-2 days it reduces the viscosity. 2'-Hydroxyacetophenone is a less effective retarder than its 4-isomer, both used with malic acid.

TABLE 9

EFFECT OF MALIC ACID, MAGNESIUM HYDROGEN MALATE, MIXTURE OF MALIC ACID WITH MONOAMMONIUM MALATE, MIXTURE OF MALIC ACID WITH 4'-HYDROXYACETOPHENONE AND MIXTURE OF MALIC ACID WITH 2'-HYDROXYACETOPHENONE ON THE FLOW OF RESIN D/HIGH PURITY MAGNESIA

| Hours Expired | Order Of Increasing Viscosity of the Mixes |
|---|---|
| | (First Part) |
| 1-3 | 2>>1 Remixed after 3 hours. |
| 5 | 2>1 |
| 8 | Mix 2 is equal to or slightly greater than Mix 1. |
| 10 | Mix 1 is equal to or slightly greater than Mix 2. |
| 11-48 | 1>>2 |
| 72 | Both mixes are tack-free |
| | (Second Part) |
| 1/3-4 | 3>4>5 |
| 10 | 3,4>5 |
| 22 | 3>5>4 Remixed prior to the 22 hour check. |
| 46 | 3>5>4 |
| 58 | Mix 3 is tack-free. |
| 70 | Mix 5 is tack-free. Mix 4 is not tack-free. |

EXAMPLE 10

Effect of Salicylaldehyde, Salicylamide and 2-Nitrophenol on Qualitative Flow of Resin D/High Purity Magnesia This example was performed to show changes in viscosity in accordance with the Qualitative Flow Procedure described hereinabove with: Mix 2 containing salicylaldehyde at a concentration of 4.4% BOR; Mix 3 containing salicylamide at a concentration of 4.4% BOR; Mix 4 containing 2-nitrophenol at a concentration of 4.4% BOR; and Mix 1 which was the Control and did not contain an additive. The results of the tests are shown in Table 10. It can be seen from Table 10 that after one day, salicylaldehyde and 2-nitrophenol increase mix viscosity relative to the Control and Salicylamide.

TABLE 10

EFFECT OF SALICYLALDEHYDE, SALICYLAMIDE AND 2-NITROPHENOL ON QUALITATIVE FLOW OF RESIN D/HIGH PURITY MAGNESIA

| Hours Elapsed | Order of Increased Vscosity for the Various Mixes |
|---|---|
| 2.5-7 | 2>4>1,3 |
| 23 | 2,4>1,3 Mixes 2 and 4 are essentially immobile but not tack-free. Mixes 1 and 3 move very slowly. |
| 48 | All mixes are immobile and tack-free. |

EXAMPLE 11

Effect of Malic Acid and a Mixture of Malic Acid with N,N-Dimethylethanolamine on Qualitative Flow of Resin B/High Purity Magnesia In this example, the resin was Resin B and viscosity comparisons in accordance with the Qualitative Flow Procedure were made involving malic acid at a concentration of 1.4% BOR (Mix 1); to a mixture of malic acid at a concentration of 2.8% BOR with N,N,-dimethylethanolamine (DMEA) at a concentration of 1% BOR (Mix 2).

The results of this example are shown in Table 11 where it can be seen that increasing the concentration of malic acid in the presence of DMEA is very effective in prolonging flow and mix life.

TABLE 11

EFFECT OF MALIC ACID AND A MIXTURE OF MALIC ACID WITH N,N-DIMETHYLETHANOLAMINE ON QUALITATIVE FLOW OF RESIN B/HIGH PURITY MAGNESIA

| Hours Elapsed | Order of Increasing Viscosity of the Various Mixes |
|---|---|
| 1 | Mix 2 is equal or slightly greater than Mix 1. |
| 2 | 2>1 Remixed after 2 hours. |
| 4-7 | 2>>1 Remixed after 6 hours. |
| 24 | 2>>1 No obvious change from 7 hours. |
| 72 | 2>>1 Small increase in mix viscosity from 24 hours. Remixed after 72 hours at which time 1>2. |
| 95 | Mix 1 is tack-free while Mix 2 still shows flow. |
| 7 days | Mix 2 is still not tack-free. |

EXAMPLE 12

Retardation of Hardening with Ammonium Fluoride

A raw batch composition was prepared by intimately admixing: Resin M at a concentration of 36 g per 300 g of a mixture of 3 sands as will be described hereafter; gamma butyrolactone (25% BOR); about 18% dead-burned magnesia aggregate BOR; water, 8.3% BOR; and 1% BOR of 3-glycidoxypropyltrimethoxy silane. Resin M is a phenol formaldehyde resole resin prepared by reacting formaldehyde with phenol at a molar ratio of 1.25 using sodium hydroxide as catalyst. The resin intermediate is then formulated with acetic acid, ethanol, methanol, and N,N-dimethylformamide (DMF) to provide Resin M which has: a Gardner-Holt viscosity of 2,560 centistokes at 25° C. or approximately 3,000 cps at 25° C.; 68% solids; 7% free phenol; 10% lower alkyl alcohols; 12 % water; 4% DMF; a pH of 5.9; and a weight average molecular weight of 4,000. The mixture of sands was made up of: 198 g of coarse sand; 72 g of medium grain sand; and 30 g of fine grain sand. The deadburned magnesia aggregate was 98.1% MgO on an ignited basis with a bulk specific gravity of 3.28 with 95% thereof passing through a 50 U.S. Sieve Series screen.

Without a retarder, the above raw batch composition showed a 24 hour compressive strength of 105 psi. With the addition of 2% BOR of ammonium fluoride, the composition remained soft after 5 days at room temperature. Following the procedure of this example, similar results can be obtained by using, in place of the butyrolactone, propylene carbonate or triacetin. Also, retardation can be obtained by substituting hardburned magnesia in this example, in place of the deadburned magnesia.

EXAMPLE 13

Effect of Retarder Using Resole/Novolac Blend with High Purity Magnesia

Novolac A solution (65% solids with 25% furfuryl alcohol and 10% ethanol and a molecular weight of about 600 and having a viscosity of about 217o cps at 25° C.) was mixed 1:1 by weight with Resin D to give a viscosity of about 2520 cps at 25°. This composition was tested without an additive as Mix 1 and with 0.33% BOR of ammonium bifluoride dispensed as a 33% aqueous solution as Mix 2. These two Mixes were tested in accordance with the Qualitative Flow Procedure. The results are shown below.

| Hours Elapsed | Order of Viscosity Increase of the Various Mixes |
|---|---|
| 1-3 | Mix 1 equal or slightly greater than Mix 2. |
| 6-10 | 1>2 |
| 14-23 | 1>>2 |

It can be seen from the above results that ammonium bifluoride is a very effective mix life extender with a blend of resole and novolac.

EXAMPLE 14

Effect of Retarder on Qualitative Flow When Using Novolac Alone With High Purity Magnesia Aggregate This example shows the effect of a retarder when using novolac A alone with the High Purity magnesia. Novolac A solution of the above Example 13 with viscosity of about 2170 cps at 25° C. was tested in accordance with the Qualitative Flow Procedure with and without a bifluoride retarder (0.33% BOR). After 24 hours and after 50 hours both the sample with and the sample without the retarder were very fluid. The same results were observed after 5 days and again after 7 days. In this example the retarder had no effect on the sample during the time period involved.

EXAMPLE 15

Effect of Retarder on Qualitative Flow When Using Novolac Alone as the Phenolic Resin with Standard Grade Magnesia This example shows the effect of a retarder using Novolac B with Standard Grade deadburned magnesia but without a resole resin. The phenol formaldehyde Novolac B resin was dissolved as a 60% solids solution in ethylene glycol with about 3.5% water and a molecular weight of about 3000 and a viscosity of about 5,700 cps at 25° C. The procedure used in this example is the Qualitative Flow Procedure. The Standard Grade magnesia contained 2.5% of CaO instead of only 0.82% of CaO as in the High Purity magnesia. Mix 1 was the Control together with 0.6% of water BOR. Mix 2 contained 0.33% of ammonium bifluoride BOR, dispensed as a 33% aqueous solution.

| Hours Expired | Order of Viscosity Increase for Various Mixes |
|---|---|
| 1-8 | Mix 1 is equal or slightly greater than Mix 2 with both being very fluid. |
| 27 | Mix 1 is equal or slightly greater than Mix 2 and both mixes are fairly fluid. |
| 31 | Mix 1 is equal or slightly greater than that of Mix 2. |
| 36-72 | 1>2 but both are still mobile. |
| 72 | 1>2 but both are still mobile. |

From the above table it can be seen that the use of the Standard Grade magnesia containing 2.5 % CaO in place of the High Purity magnesia which contained only 0.82% of CaO was effective in retarding the hardening of the resin during the time period involved. Similar results can be obtained by substituting hardburned magnesia containing about 2.5% CaO in place of the Standard Grade magnesia.

EXAMPLE 16

Effect of Ammonium Bifluoride on Qualitative Flow of Resin D/High Purity Magnesia This example shows the effect of a retarder using Resin D and the Standard Grade magnesia described hereinabove. Mix 1 in the table below is the Control plus 0.6% BOR of water and Mix 2 contained 0.33% of ammonium bifluoride BOR dispensed as a 33% solution in water.

| Hours Elapsed | Order of Viscosity Increase for Various Mixes |
|---|---|
| 1/3 | Mix 1 equal or slightly greater than Mix 2. |
| 1-2 | 1>2 |
| 3-6 | 1>>2 Mix 1 moves very slowly after 6 hours. |
| 20 | 1>>>2 Mix 1 is taffy-like. |
| 47 | 1>>>2 Mix 1 is tack-free. Mix 2 still fairly mobile. |

It can be seen from the results of Example 16 that bifluoride retarder is also very effective with higher calcium containing magnesia aggregate.

EXAMPLE 17

Effect of Silane and Polyphosphonic Acid on Resin D/High Purity Magnesia

This example was performed in the manner set forth in the Qualitative Flow Procedure. Mix 1 was the Control which contained 2% of water as diluent. Mix 2 contained 2% BOR of water as diluent plus 2% BOR tetraethyl orthosilicate (tetraethoxy silane). Mix 3 contained 2% BOR of water and 2% BOR of aminotri(methylene phosphonic acid). The tests in this example were performed in accordance with the Qualitative Flow Procedure and the results are shown below.

| Hours Elapsed | Order of Increasing Viscosity of the Various Mixes |
|---|---|
| 1 | 1>3 and 3 equal or slightly greater than 2. |
| 3 | 1>>3 equal or slightly greater than 2. |
| 7 | 1>>3>2 |
| 27 | 1>3>>2 Mix 1 is thick and taffy-like while Mix 2 is still quite fluid. |
| 36 | 1>3>>>2 Mix 2 is still fluid. |
| 39 | Mix 1 is not tack-free. |
| 48 | Mix 1 is tack-free but Mix 2 is still fluid. |
| 72 | Mix 3 is tack-free but Mix 2 still moves. |

It can be seen from the results of Example 17 that tetraethoxy silane is an effective retarder whereas the polyphosphonic acid is a less effective retarder than the silane.

EXAMPLE 18

Effect of Ester and Retarder on Viscosity of Resin D/High Purity Magnesia

Two sets of tests were performed in this example. The first series of tests were performed in accordance with Procedure A described hereinbefore and the results of these tests are shown in Part A below. The second series of tests were performed in accordance with the Qualitative Flow Procedure and the results of that series of tests are shown in Part B below. In both Part A and Part B : Mix 1 was the Control which did not contain an additive, but in place contained 2-methoxyethyl ether (an inert solvent) 10% BOR and 0.5% water BOR; Mix 2 contained gamma-butyrolactone at a concentration of 10% BOR and water at a concentration of 0.5% BOR; and Mix 3 contained gamma-butyrolactone at a concentration of 10% BOR and 0.25% BOR of ammonium bifluoride which was added as a 33% solution in water 0.75% BOR. In the first column of the table in Part A, the designator "No MgO" means that the viscosity measurement was taken before addition of the High Purity magnesia, i.e., the composition was "neat".

PART A

| | VISCOSITY (25°), CPS × 10³ | | | |
|---|---|---|---|---|
| Mix | No MgO | 0 Hrs. | 6 Hrs. | 24 Hrs. |
| 1 | 1.900 | 4.70 | 22.50 | 158.00 |
| 2 | 1.250 | 4.60 | >400 | — |
| 3 | 1.000 | 4.70 | 11.75 | >400 |

It can be seen from the above Part A that the bifluoride exhibits strong retarding effect for at least 6 hours (Mix 3 vs Mix 2) and replacement of ester by the inert solvent greatly extends mix life (Mix 1 vs Mix 2)

Part B

One hour old mixes were mixed well and about 11 g of each transferred to a vial to observe viscosity changes with time.

| Hours Elapsed | Order of Increasing Viscosity of the Mixes |
|---|---|
| 0 | Mix 2 equal or slightly greater than 1 >3. |
| 1 | 2>3>1 |
| 2 | 2>>31 |
| 3 | 2>>3>1 Mix 3 is still very fluid. |
| 6 | 2>>>1>3 Mix 3 is still very fluid. |
| 22 | 2,3>>1 Mix 2 is close to tack-free. Mix 3 is very sticky. Mix 1 is moderately mobile. |
| 30 | Mix 2 is tack-free. Mix 3 is not tack-free. |
| 44 | Mix 3 is tack-free. Mix 1 moves very slowly. |
| 69 | Mix 1 is immobile and sticky. |
| 95 | Mix 1 is not tack-free. |

It can be seen from Part B of this Example that the conclusion of Part A is confirmed. The bifluoride exhibits a strong retarding effect and replacement of ester by inert diluent greatly extends mix life. This also substantiates the validity of correlating the Qualitative Flow Procedure with that of obtaining Brookfield viscosities as in Procedure A.

PROCEDURE FOR PREPARING REFRACTORY TENSILE SPECIMENS 2.0 kg aggregate mix of 1360 g of deadburned magnesia having a 99+% MgO content with a 14/48 sieve size; 240 g of deadburned magnesia having a 99+% MgO content with a −200 mesh sieve size; and 400 g of crystalline graphite was stored overnight in a plastic bag in a 130° F. (54° C.) oven. The warm aggregate was charged to a 5 quart 3-speed Hobart mixer and 83.3 g Resin [4.2% on aggregate which was prewarmed to 90° F. (32° C.)] was added. An intimate mix was obtained by mixing 1 minute at slow speed, 5 minutes at medium speed and 3 minutes at high speed. The final mix temperature was about 116° F. (41° C.). Tensile dogbone specimens 3 inches long, 1 inch thick and 1 inch at the neck were prepared by charging a die with 150 g mix and compressing under 15 tons pressure for 1 minute, Unused mix was placed in a 90° F. oven for further use. Tensile strengths in psi were determined on a Universal Sand Strength Test Machine.

EXAMPLE 19

Effect of Retarder on Mix Life/Tensile Strength of Resin D

The refractory tensile specimens were prepared in accordance with the above Procedure For Preparing Refractory Tensile Specimens and the resin used was Resin D. Mix 1 was the Control and did not contain a retarder. Mix 2 contained 1.4% malic acid BOR. Tensile strengths were determined at various times as shown.

| Mix | TENSILE STRENGTH, PSI (AVERAGE OF 2 OR 3) | | | | |
|---|---|---|---|---|---|
| | 0 Hrs. | 4 Hrs. | 24 Hrs | 48 Hrs | 72 Hrs |
| 1 | 11 | 8 | 16 | 21 | 32 |
| 2 | 6 | 5 | 17 | 30 | 61 |

It was observed that Mix 1 became progressively drier with time. Mix 2 remained wetter than Mix 1. It can be seen from the above table that the retarder reduces early strength (0–4 Hrs), equals control after one day but provides significantly higher strengths after 2–3 days.

EXAMPLE 20

Qualitative Flow Studies of Resin B/High Purity Magnesia

This example was run in accordance with the Qualitative Flow Procedure. Results were noted of a control with no additives in comparison with samples containing various additives, as set forth below. The test period lasted over a period of 5 days. It was observed that trimellitic acid (1,2,4-benzenetricarboxylic acid) additive at 1.0% BOR acted as a moderately effective accelerator. Sulfanilic acid (4-aminobenzenesulfonic acid) additive at a concentration of 1.5% BOR acted as a mild accelerator and aspartic acid additive at a concentration of 1.5% BOR acted as a mild retarder.

EXAMPLE 21

Effect of Citric Acid on Qualitative Flow of Resin D/High Purity Magnesia

This example was run in accordance with the Qualitative Flow Procedure with Resin D as the phenolic resin and High Purity magnesia as the aggregate. Mix 1 was the Control with no additive and was compared to Mix 2 which contained citric acid at 1.1% BOR dispensed as a 55% solution in water. The results are shown below.

| Hours Elapsed | Order of Viscosity Increase For The Various Mixes |
|---|---|
| 0.5 | 2>>1 |
| 3.5-6 | 2>1 Remixed after 6 hours. |
| 6* | 1>2 Therefore, citric acid shows early thixotropy. |
| 11-19 | 1>>2 |
| 22 | 1>>>2 Mix 1 is immobile while Mix 2 is still quite fluid. |
| 45 | Mix 1 is not tack-free while Mix 2 is still mobile. |
| 70 | Mix 1 barely tack-free while Mix 2 moves slowly. |
| 94 | Mix 2 is almost-tack free. |

*It can be seen from this Example 21 that citric acid provides early thixotropy and is an effective retarder.

EXAMPLE 22

Compatibility Studies of Resole/Retarder Mixes

The purpose of this example was to determine compatibility of various retarders in different resole resins. The procedure followed in this example was simply to add the retarder to the resin in glass vials at the concentration (BOR) set forth in parenthesis following the name of the additive in Table 22. In one of of the mixes an amine salt forming agent was added to the acid retarder at the concentration, BOR set forth in the table. The materials in the glass vials were vigorously mixed and observations were made during the indicated time periods. The results are shown in Table 22 below.

TABLE 22

| Resin | Retarder (% BOR) | Observation |
|---|---|---|
| B | Ammonium bifluoride (0.2%) | Immediately became milky. Very slow settling of solids in several days. |
| B | Malic acid (2%) and Salicylic acid (0.8%) | Precipitate evident after 1 day. |
| B | Ethyl ortho silicate (2%) (Tetraethoxy silane) | Cloudy within one day. Continued to become more opaque over several days. |
| B | Malic acid (2%) and Choline base (0.9%) | Precipitate formed within 1 day. |
| B | Oxalic acid (0.8%) | Precipitated in less than 1 day. |
| B | Citric acid (1.1%) | Hazy but no precipitate after 1 through 22 days. Crystals obvious after 12 days. |
| D | Malic acid (2.5%) and N,N-dimethylethanolamine (1.3%) | |
| D | Malic acid (1.4%) | Significant crystals were observed after 6 days. |
| E | Ammonium bifluoride (0.28%) | Clear after 25 days. |
| E | Citric acid (1.1%) | Clear after 25 days. |
| E | Malic acid (1.1%) | Cloudy grainy appearance after 4 days. |
| E | Tartaric acid (1.1%) | Turbid in several hours. Hazy after about 14 hours with no obvious change through 3 days and subsequently there was some settling after two weeks. |
| F | Ammonium bifluoride (0.28%) | Clear after 25 days. |
| F | Tartaric acid (1.1%) | Clear after 25 days. |

The results of this example show that the resole resin which was catalylzed with potassium hydroxide (Resin E) and the resole resin catalyzed with amine (Resin F) have improved compatibility with retarders relative to the sodium hydroxide (Resin B) catalyzed resole resin.

EXAMPLE 23

Ionization Constants ($pK_a$) of Acids and Phenols Used in the Examples

This example in column S shows the type of activity of the various additives with "A" indicating that the additive was an accelerator, "R" indicating that the additive was a retarder and "N" indicating that the additive was neutral. The table also sets forth $pK_a$ of the additives with $pK_1$ being the $pK_a$ for the monoacids. The $pK_a$ values were obtained from J.A. Dean, Handbook of Organic Chemistry, McGraw-Hill Publishing Co., N.Y., 1987.

| S | Additive (Acid) | $pK_1$ ($pK_a$) | $pK_2$ | $pK_3$ |
|---|---|---|---|---|
| A | Acetic | 4.76 | | |

-continued

| S | Additive (Acid) | pK$_1$ (pK$_a$) | pK$_2$ | pK$_3$ |
|---|---|---|---|---|
| A | Adipic | 4.42 | 5.41 | |
| R | Aspartic | 3.87 | 10.00 | |
| R | 2-Chlorophenol | 8.55 | | |
| A | Formic | 3.75 | | |
| N | Glutamic | 4.31 | 9.76 | |
| A | Glycolic | 3.83 | | |
| R | Citric | 3.13 | 4.76 | 6.40 |
| R | Hydrogen fluoride | 3.17 | | |
| R | 2'-Hydroxyacetophenone | 9.90 | | |
| R | 4'-hydroxyacetophenone | 8.05 | | |
| A | Lactic | 3.86 | | |
| R | Malic | 3.46 | 5.10 | |
| A | 2-Nitrophenol | 7.22 | | |
| A | 4-Nitrophenol | 7.15 | | |
| R | Oxalic | 1.27 | 4.27 | |
| R | Phosphoric | 2.15 | 7.20 | 12.38 |
| N | Salicylic | 2.98 | | |
| A | Salicylaldehyde | 8.34 | | |
| N | Salicylamide | 8.36 | | |
| R | Silicic[a] | 9.77 | 11.80 | |
| A | Succinic | 4.21 | 5.64 | |
| A | Sulfanilic | 3.23 | | |
| R | Tartaric | 3.04 | 4.37 | |
| A | Trimellitic | 2.52 | 3.84 | 5.20 |

[a]Potential hydrolysis product of tetraalkoxy silane.

It can be seen from Example 23 that there is no obvious correlation of ionization constants with retarder/accelerator activity of resin/MgO mixes.

EXAMPLE 24

Effect of Additives on Flow of Resin B/High Purity Magnesia

This example was performed in accordance with the Qualitative Flow Procedure. In this example: Mix 1 is the control with no additive; Mix 2 is phenolsulfonic acid at 1.4% BOR as the additive; Mix 3 is lithium nitrate as the additive at 1.1% BOR; and Mix 4 contained ammonium sulfamate as the additive at a concentration of 1.4% BOR. All the mixes contained 1.4% BOR of added water. The results of this example are shown below.

| Hours Elapsed | Order of Viscosity Increase For the Various Mixes |
|---|---|
| 0.5 | 4>2>3>1 where 4>>1 |
| 1 | 4>>2 equal or slightly greater than 3>1 |
| 2 | 4>>2 equal or slightly greater than 3>>1 Mix 1 was immobile while Mix 1 is quite fluid. |
| 3 | 4>2,3>>1 Mix 4 is tack-free. |
| 9 | 3>2>>>1 Mix 1 still shows moderate flow. |
| 14 | Mix 3 is close to tack-free but Mix 2 is not. |
| 21 | Mixes 2 and 3 are tack-free. |
| 31 | Mix 1 still flows. |
| 48–72 | Mix 1 is sticky. |
| 96 | Mix 1 is tack-free. |

It can be seen from the results of example 24 that: ammonium sulfamate is a powerful accelerator; and that phenolsulfonic acid and lithium nitrate are good accelerators. In an experiment run in a similar manner to the above, acetylacetone (2,4-pentanedione) at a concentration of 2% BOR showed modest accelerator activity, i.e., less than that in the above Example 24.

EXAMPLE 25

Effect of Additives on Flow of Resin E/High Purity Magnesia

This example was performed in accordance with the Qualitative Flow Procedure. Mix 1 was the control and did not contain an additive. Mix 2 contained p-toluenesulfonic acid as the additive at a concentration of 2% BOR. Mix 3 contained citric acid as the additive at a concentration of 1.5% BOR plus N,N-dimethylethanolamine (DMEA) at a concentration of 1% BOR. All of the mixes also contained an additional 1.4% BOR of water. The results of this example are shown below.

| Hours Elapsed | Order of Viscosity Increase For the Various Mixes |
|---|---|
| 0.66 | 3>2>1 |
| 1–5 | 3>2>1 with 3>>1 Mix 3 barely moves after 3–5 hours. |
| 6 | Remixed after 6 hours and then 2>3>1. |
| 14 | 3 equal or slightly greater than 2>>1. |
| 24 | 2,3>>1 Mix 1 flows fairly easily. Remixed 1 and 3 which were easily remixable whereas Mix 2 is too taffy-like to mix. slightly greater than 1>>3 with mix 3 showing good flow. |
| 26–33 | 2 equal or slightly greater than 1>>3. Mix 3 shows good flow whereas Mix 2 is not tack-free. |
| 39 | 2>1>>3. Mix 2 is just barely tack-free. |
| 72 | Mix 1 is still sticky, flowing very slowly. Mix 3 still shows moderate flow which after remixing becomes good flow. |
| 127 | Mix 1 is not tack-free and Mix 3 shows moderately good flow. |
| 144 | Mix 1 is tack-free and Mix 3 shows moderately good flow. |
| 288 | Mix 3 flows before and after remixing. |
| 336 | Mix 3 still flows. |

The resin solution containing the retarder which was used to prepare Mix 3 remained clear and homogeneous for at least 13 days.

It can be seen from the results of Example 25 that p-toluenenesulfonic acid is an accelerator whereas citric acid/DMEA shows early thixotropy but becomes a strong retarder.

That which is claimed is:

1. A method for retarding the ambient temperature hardening of a mixture of a phenolic resin and magnesia aggregate which comprises mixing:
   A. magnesia aggregate;
   B. a curable phenolic resin solution selected from the group consisting of a novolac, a resole having a pH of about 4.5 to 9.5 and a viscosity of about 100 to 10,000 cps at 25° C., and mixtures thereof, the quantity of said resin being sufficient to bind the aggregate on thermal curing of the resin; and
   C. a retarder compound in an amount sufficient to retard the ambient temperature hardening of said mixture, said retarder being a compound selected from the group consisting of:
      a compound which provides an aspartate, bifluoride, citrate, fluoride, malate, tartrate, or phosphonate anion to the mixture; or
      a tetraalkoxy silane having from 1 to 3 carbon atoms in each alkoxy group, a partially hydrolyzed tetraalkoxy silane having from 1 to 3 carbon atoms in each alkoxy group; and mixtures of the foregoing retarders.

2. The method of claim 1 wherein the aggregate is deadburned magnesia.

3. The method of claim 1 wherein the aggregate is hardburned magnesia.

4. The method of claim 1 wherein the resin is a resole resin having a pH of 5 to 8.5 and a viscosity of 250 to 5,000 cps at 25° C.

5. The method of claim 1 wherein the anion is bifluoride.

6. The method of claim 1 wherein the anion is citrate.

7. The method of claim 1 wherein the anion is fluoride.

8. The method of claim 1 wherein the anion is malate.

9. The method of claim 1 wherein the anion is tartrate.

10. The method of claim 1 wherein the compound which provides the anion is an acid and the phenolic resin is the condensation product of phenol and formaldehyde.

11. The method of claim 1 wherein the compound is a tetraalkoxy silane having from 1 to 3 carbon atoms in each alkoxy group.

12. The method of claim 1 wherein the compound is a partially hydrolyzed tetraalkoxy silane having from 1 to 3 carbon atoms in each alkoxy group.

13. The method of claim 1 wherein the phenolic resin is a solution of novolac in an organic solvent and the aggregate contains from about 1.5% to 4% of calcium oxide.

14. The method of claim 1 wherein the phenolic resin is a mixture containing from about 1 to 4 parts by weight of resole for each part of novolac.

15. The mixture of claim 1 wherein the mixture includes an additive selected from the group consisting of from about 5% to 35% of graphite based on the weight of aggregate, 1% to 5% by weight of a metal power selected from the group consisting of aluminum, magnesium, and silicon based on the weight of aggregate, and mixtures of said additives.

16. The method of claim 3 wherein the mixture includes from about 5% to 25% by weight of the phenolic resin of an ester functional hardening agent selected from the group consisting of a lactone, a carboxylic acid ester, a cyclic organic carbonate and mixtures thereof.

17. A method for retarding the ambient temperature hardening of a mixture of a phenolic resole resin and magnesia aggregate which comprises mixing:
A. magnesia aggregate;
B. a hardenable phenolic resole resin solution having a pH of 4.5 to 9.5, a viscosity of from about 100 to 10,000 cps at 25° C., a water content of about 3% to 15% by weight, said resole being in a quantity sufficient to bind the magnesia on hardening; and
C. a retarder compound in an amount sufficient to retard the ambient temperature hardening of said mixture, said retarder being a compound selected from the group consisting of:
a compound which provides an aspartate, bifluoride, citrate, fluoride, malate, tartrate, or phosphonate anion to the mixture; or
a tetraalkoxy silane having from 1 to 3 carbon atoms in each alkoxy group, a partially hydrolyzed tetraalkoxy silane having from 1 to 3 carbon atoms in each alkoxy group; and mixtures of the foregoing retarders.

18. The method of claim 17 wherein the anion is bifluoride.

19. The method of claim 17 wherein the anion is citrate.

20. The method of claim 17 wherein the anion is fluoride.

21. The method of claim 17 wherein the anion is malate.

22. The method of claim 17 wherein the anion is tartrate.

23. The method of claim 17 wherein the retarder is an acid.

24. The method of claim 17 wherein the compound is tetraalkoxy silane having from 1 to 3 carbon atoms in each alkoxy group.

25. The method of claim 17 wherein the compound is partially hydrolyzed tetraalkoxy silane having from 1 to 3 carbon atoms in each alkoxy group.

26. The method of claim 17 wherein the magnesia is deadburned magnesia.

27. The method of claim 17 wherein the resole resin contains less than 1% by weight of sodium or potassium.

28. The method of claim 17 wherein the resin has a viscosity of from about 250 to 5,000 cps at 25° C. and a solids content of about 50% to 90% by weight, the mixture contains from about 3% to 12% by weight of water, the magnesia contains less than 3% by weight of calcium oxide, and the phenolic resole is the condensation product of phenol and formaldehyde.

29. The method of claim 28 wherein the resin contains less than 0.5% by weight of sodium or potassium.

30. The method of claim 28 wherein the mixture contains an ester functional hardening agent in an amount sufficient to increase the tensile and compressive strength of the composition at ambient temperature after hardening, said ester being selected from the group consisting of a lactone, a carboxylic acid ester, a cyclic organic carbonate and mixtures thereof.

31. The method of claim 30 wherein the ester is a lactone.

32. A binder-aggregate composition comprising a wet mixture of:
A. magnesia aggregate;
B. a curable phenolic resin solution selected from the group consisting of a novolac, a resole having a pH of about 4.5 to 9.5 and a viscosity of about 100 to 10,000 cps at 25° C., and mixtures thereof, the quantity of said resin being from about 3% to 15% by weight of the magnesia; and
C. a retarder compound in an amount sufficient to retard the room temperature hardening of said mixture, said retarder being a compound selected from the group consisting of:
a compound which provides an aspartate, bifluoride, citrate, fluoride, malate, tartrate, or phosphonate anion to the composition; or
a tetraalkoxy silane having from 1 to 3 carbon atoms in each alkoxy group, a partially hydrolyzed tetraalkoxy silane having from 1 to 3 carbon atoms in each alkoxy group; and mixtures of the foregoing retarders.

33. The composition of claim 32 wherein the phenolic resin is a resole having a pH of 5 to 8.5, a viscosity of 250 to 5,000 cps at 25° C. and wherein the resole contains from 3% to 15% by weight of water.

34. The composition of claim 32 wherein the phenolic resin is a solution of a novolac in an organic solvent.

35. The composition of claim 32 wherein the anion is bifluoride in a quantity of 0.1% to 1.0% based on the weight of resin.

36. The composition of claim 32 wherein the anion is citrate in a quantity of 0.5% to 2.5% based on the weight of resin.

37. The composition of claim 32 wherein the anion is fluoride, in a quantity of 0.1% to 1% based on the weight of resin.

38. The composition of claim 32 wherein the anion is malate, in a quantity of 0.5% to 2.5% by weight of resin.

39. The composition of claim 32 wherein the anion is tartrate, in a quantity of 0.5 % to 2.5% based on the weight of resin.

40. The composition of claim 32 wherein the magnesia is deadburned magnesia.

41. The composition of claim 32 wherein the compound is tetraalkoxy silane having from 1 to 3 carbon atoms in each alkoxy group.

42. The composition of claim 32 wherein the compound is a partially hydrolyzed tetraalkoxy silane having from 1 to 3 carbon atoms in each alkoxy group.

43. A binder-aggregate composition comprising a mixture of:
   A. magnesia aggregate;
   B. a hardenable phenolic resole resin solution having a pH of 4.5 to 9.5 and containing from 3% to 15% of water by weight of the resin, the quantity of said resin being from 3% to 15% based on the weight of the magnesia; and
   C. a retarder compound in an amount sufficient to retard the ambient temperature hardening of said resole and magnesia, said retarder being a compound selected from the group consisting of:
      a compound which provides an aspartate, bifluoride, citrate, fluoride, malate, tartrate, or phosphonate anion to the composition; or
      a tetraalkoxy silane having from 1 to 3 carbon atoms in each alkoxy group, a partially hydrolyzed tetraalkoxy silane having from 1 to 3 carbon atoms in each alkoxy group; and mixtures of the foregoing retarders.

44. The composition of claim 43 wherein the aggregate is deadburned magnesia.

45. The composition of claim 43 wherein the aggregate is hardburned magnesia.

46. The composition of claim 43 which includes an additive selected from the group consisting of from about 5% to 35% of graphite based on the weight of aggregate, 1% to 5% of a metal powder based on the weight of aggregate and selected from the group consisting of aluminum, magnesium, and silicon, and mixtures of said additives.

47. The composition of claim 43 wherein the compound which provides the anion is an acid.

48. A method for retarding the ambient temperature hardening of a mixture of a phenolic resole resin and magnesia aggregate which comprises mixing:
   A. magnesia aggregate;
   B. a hardenable phenolic resole resin solution having a pH of 5 to 8.5, a viscosity of 250 to 5,000 cps at 25° C. and containing from about 3% to 15% of water based on the weight of resin, the quantity of said resin being sufficient to bind the magnesia on hardening of the resin; and
   C. a compound which provides anions selected from the group consisting of phosphate and oxalate to the mixture in an amount sufficient to retard the ambient temperature hardening of said mixture.

49. A method for retarding the ambient temperature hardening of a mixture of a phenolic resole resin and magnesia aggregate which comprises mixing:
   A. magnesia aggregate;
   B. a hardenable phenolic resole resin solution wherein the resin was prepared by use of a condensation catalyst selected from the group consisting of potassium hydroxide and an amine, said resole having a pH of 4.5 to 9.5, a viscosity of from about 100 to 10,000 cps at 25° C., a water content of about 3% to 15% by weight, said resole being in a quantity sufficient to bind the magnesia on hardening of the resin; and
   C. a retarder compound in an amount sufficient to retard the ambient temperature hardening of said mixture, said retarder being compound selected from the group consisting of:
      a compound which provides an aspartate, bifluoride, citrate, fluoride, malate, tartrate, or phosphonate anion to the mixture; or
      a tetraalkoxy silane having from 1 to 3 carbon atoms in each alkoxy group, a partially hydrolyzed tetraalkoxy silane having from 1 to 3 carbon atoms in each alkoxy group; and mixtures of the foregoing retarders.

50. The method of claim 49 wherein the resin is the condensation product of phenol and formaldehyde and the catalyst is potassium hydroxide.

51. The method of claim 50 wherein the retarder is malic acid.

52. The method of claim 50 wherein the retarder is citric acid.

53. The method of claim 50 wherein the retarder is tartaric acid.

54. The method of claim 50 wherein the retarder is a fluoride.

55. The method of claim 50 wherein the retarder is a bifluoride.

* * * * *